United States Patent
Okada

[11] Patent Number: 6,006,165
[45] Date of Patent: Dec. 21, 1999

[54] SPEED MEASURING APPARATUS AND TOY FOR MEASURING SPEED OF MOVING MEMBER

[75] Inventor: Setsuo Okada, Hokkaido, Japan

[73] Assignee: Hudson Soft Co., Ltd., Hokkaido, Japan

[21] Appl. No.: 08/987,954

[22] Filed: Dec. 10, 1997

[30] Foreign Application Priority Data

Dec. 11, 1996 [JP] Japan .................................. 8-330970

[51] Int. Cl.$^6$ .................................................. G04B 17/20
[52] U.S. Cl. ............................ 702/96; 702/142; 702/149; 331/66
[58] Field of Search ............................... 702/96–97, 116, 702/142, 149; 324/161, 166; 473/190, 192, 198; 331/47–48, 66, 70

[56] References Cited

U.S. PATENT DOCUMENTS

| | | | |
|---|---|---|---|
| 4,031,466 | 6/1977 | Krause et al. | 324/166 |
| 4,303,983 | 12/1981 | Chaborski . | |
| 4,305,041 | 12/1981 | Frerking | 327/39 |
| 4,371,271 | 2/1983 | Bellet . | |
| 4,438,412 | 3/1984 | Malinowski et al. | 331/2 |
| 4,537,515 | 8/1985 | Dinger et al. | 331/66 |
| 4,858,922 | 8/1989 | Santavasi | 473/192 |
| 5,092,602 | 3/1992 | Witler et al. | 473/199 |
| 5,232,063 | 8/1993 | Stoller | 177/210 FP |
| 5,568,406 | 10/1996 | Gerber | 702/142 |
| 5,748,570 | 5/1998 | Komada | 368/202 |

FOREIGN PATENT DOCUMENTS

| | | |
|---|---|---|
| 2 492 988 | 4/1982 | France . |
| 2 239 590 | 2/1974 | Germany . |
| 2 225 849 | 6/1990 | United Kingdom . |

*Primary Examiner*—John Barlow
*Assistant Examiner*—Bryan Bui
*Attorney, Agent, or Firm*—Helfgott & Karas, PC.

[57] ABSTRACT

A speed measuring apparatus and a toy for measuring a speed of a moving member has a quartz oscillator for generating a clock signal which has a predetermined frequency, a CR oscillator for generating a clock signal which has a higher frequency than that of the quartz oscillator, a comparative circuit, connected with the quart oscillator and the CR oscillator, for comparing the oscillation frequency of the quartz oscillator as a reference signal with the oscillation frequency of the CR oscillator, a corrective circuit, connected with the comparative circuit, for calculating a corrective factor in accordance with a result from the comparative circuit, a measuring unit, connected with the CR oscillator and the corrective circuit, for measuring a speed of the moving member in accordance with the clock signal from the CR oscillator and the corrective factor from the corrective circuit, and a display unit, connected with the measuring unit, for displaying the speed computed by the measuring unit. Therefore, in the speed measuring apparatus and the toy, the speed can be measured correctly with an increased number of significant figures, and the increase of the cost is suppressed, even if the oscillation frequency of the CR oscillator is fluctuated by the fluctuations of the temperature and the humidity, because the clock signal from the CR oscillator is corrected in accordance with the clock signal from the quartz oscillator.

4 Claims, 7 Drawing Sheets

FIG.2B

| CONDITION | OSCILLATION FREQUENCY OF CR OSCILLATOR 12 | OSCILLATION FREQUENCY OF QUARTZ OSCILLATOR 11 | CORRECTIVE FACTOR |
|---|---|---|---|
| CONDITION b1 | 62520 | 100 | 1.00032 |
| CONDITION a1 | 62510 | 100 | 1.00016 |
| REFERENCE CONDITION | 62500 | 100 | 1.0 |
| CONDITION a2 | 62490 | 100 | 0.99984 |
| CONDITION b2 | 62480 | 100 | 0.99968 |

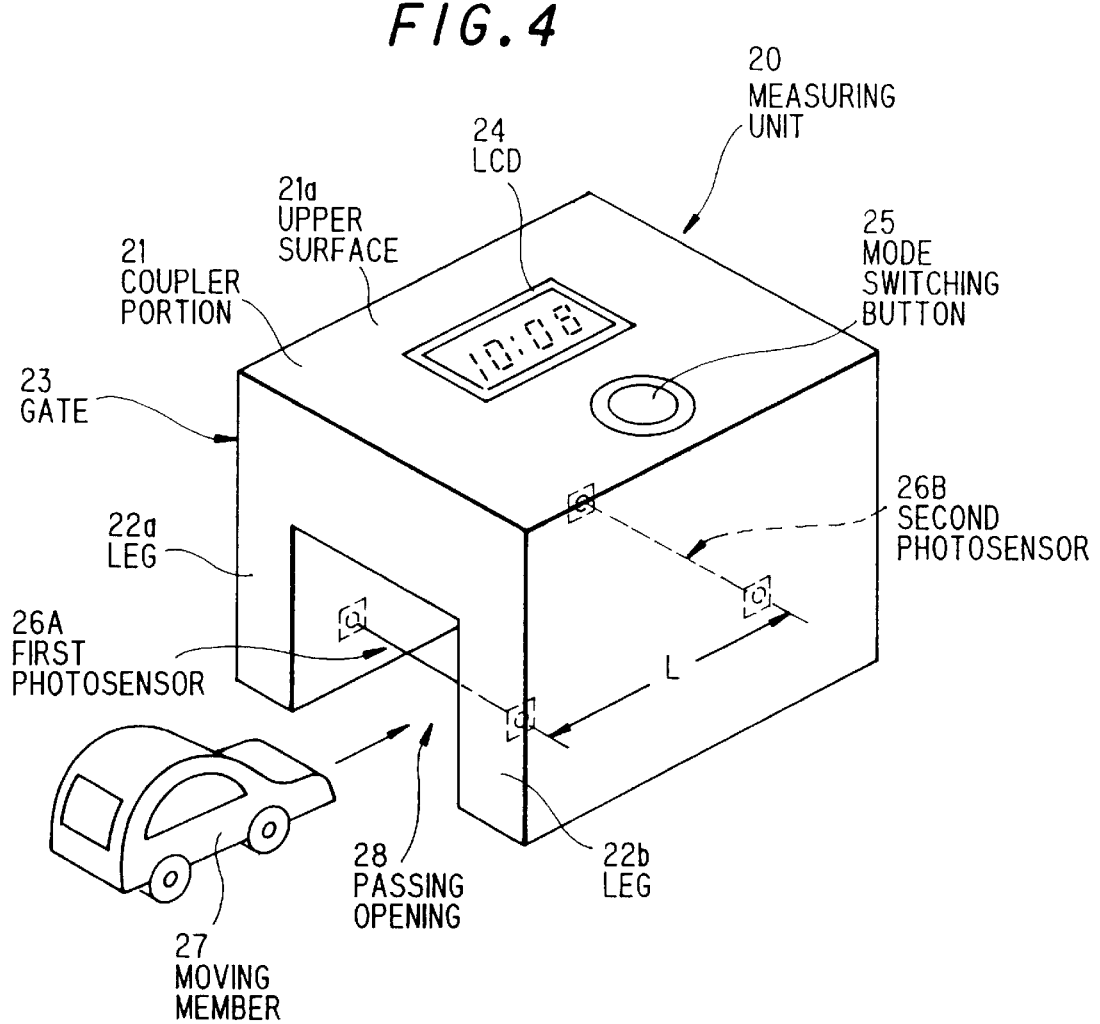

SPEED MEASURING APPARATUS AND TOY FOR MEASURING SPEED OF MOVING MEMBER

FIELD OF THE INVENTION

The invention relates to a speed measuring apparatus and a toy for measuring a speed of a moving member, and more particularly to, a speed measuring apparatus and a toy which can measure a speed of a moving member with high precision by correcting a fluctuation of an oscillation frequency which is a base in measuring the speed.

BACKGROUND OF THE INVENTION

A conventional speed measuring apparatus for measuring a speed of a moving member comprises a first set of a first infrared ray photoelectric tube and a first infrared ray projector, and a second set of a second infrared ray photoelectric tube and a second infrared ray projector. The first and second infrared ray photoelectric tubes are placed on a side of a road. The first and second infrared ray projectors are placed on the other side of the road in opposition to the first and second infrared ray photoelectric tubes, respectively. The first and second sets are positioned along the road with a predetermined interval of, for instance, 7 m. First and second infrared rays are projected from the first and second infrared ray projectors to the first and second infrared ray photoelectric tubes, respectively.

When an auto car moves on the road, the auto car interrupts the first and second infrared rays, respectively. The conventional speed measuring apparatus measures a time period from the interruption of the first infrared rays to that of the second infrared rays to measure a speed of the auto car by using an oscillating circuit having a CR oscillator or a quartz oscillator.

However, the conventional speed measuring apparatus for measuring a speed of a moving member by using a general purpose quartz oscillator has disadvantages in that it can not measure a speed with higher precision than an unit of $1/10$ second.

Further, the conventional speed measuring apparatus for measuring a speed of a moving member by using a special purpose quartz oscillator has disadvantages in that its cost is high to measure a speed with higher precision than an unit of $1/100$ second, because a quartz oscillator which has a high oscillation frequency is expensive.

Even further, the conventional speed measuring apparatus for measuring a speed of a moving member by using a CR oscillator has disadvantages in that it can not measure correctly a speed, because the precision of the CR oscillator is affected in accordance with fluctuations of the temperature and the humidity.

Further, the conventional speed measuring apparatus for measuring a speed of a moving member has disadvantages in that it can not be used as a speed measuring toy, because it is hard to miniaturize the conventional speed measuring apparatus which has the first and second sets of the infrared ray projectors and the infrared ray photoelectric tubes to be positioned with a predetermined interval of, for instance, 7 m.

SUMMARY OF THE INVENTION

Accordingly, it is an object of the invention to provide a speed measuring apparatus and a toy for measuring a speed of a moving member in which a speed can be measured correctly with an increased number of significant figures, and the increase of the cost is suppressed, even if the fluctuations of the temperature and the humidity are occurred.

It is another object of the invention to provide a speed measuring apparatus for measuring a speed of a moving member, the size of which can be made small to be used for a toy.

According to the first feature of the invention, a speed measuring apparatus for measuring a speed of a moving member, comprises first oscillating means for generating a clock signal of a first frequency affected by fluctuations of the temperature and the humidity, measuring means for measuring data by using the first oscillating means, second oscillating means for generating a clock signal of a second frequency unaffected by the fluctuations of the temperature and the humidity, and correcting means for calculating a corrective factor by a ratio of the first frequency of the first oscillating means and the second frequency of the second oscillating means, and for correcting the data by using the corrective factor.

According to the second feature of the invention, a speed measuring toy for measuring a speed of a moving member, comprises a gate comprising a couple of legs and a coupler portion which couples the legs, the gate having a passing opening through which the moving member passes, detecting means, placed in the gate, for detecting the moving member to produce a detecting signal, first oscillating means for generating a clock signal of a first frequency affected by fluctuations of the temperature and the humidity, measuring means for measuring a speed data by using the first oscillating means in accordance with the detecting signal, second oscillating means for generating a clock signal of a second frequency unaffected by the fluctuations of the temperature and the humidity, correcting means for calculating a corrective factor by a ratio of the first frequency of the first oscillating means and the second frequency of the second oscillating means, and for correcting the speed data by using the corrective factor, and displaying means for displaying the speed data from the measuring means after the speed data is corrected by the correcting means.

BRIEF DESCRIPTION OF THE DRAWINGS

The invention will be described in more detail in conjunction with the accompanying drawings, wherein:

FIG. 2B is a table of a relation between an environmental condition and a corrective factor;

FIG. 4 is a perspective view of a speed measuring toy for measuring a speed of a moving member in a preferred embodiment according to the invention;

DETAILED DESCRIPTION OF THE PREFERRED EMBODIMENTS

Before explaining a speed measuring apparatus and a toy for measuring a speed of a moving member in the preferred embodiment according to the invention, the above mentioned conventional speed measuring apparatus for measuring a speed of a moving member will be explained in FIG. 1.

Figure 1:
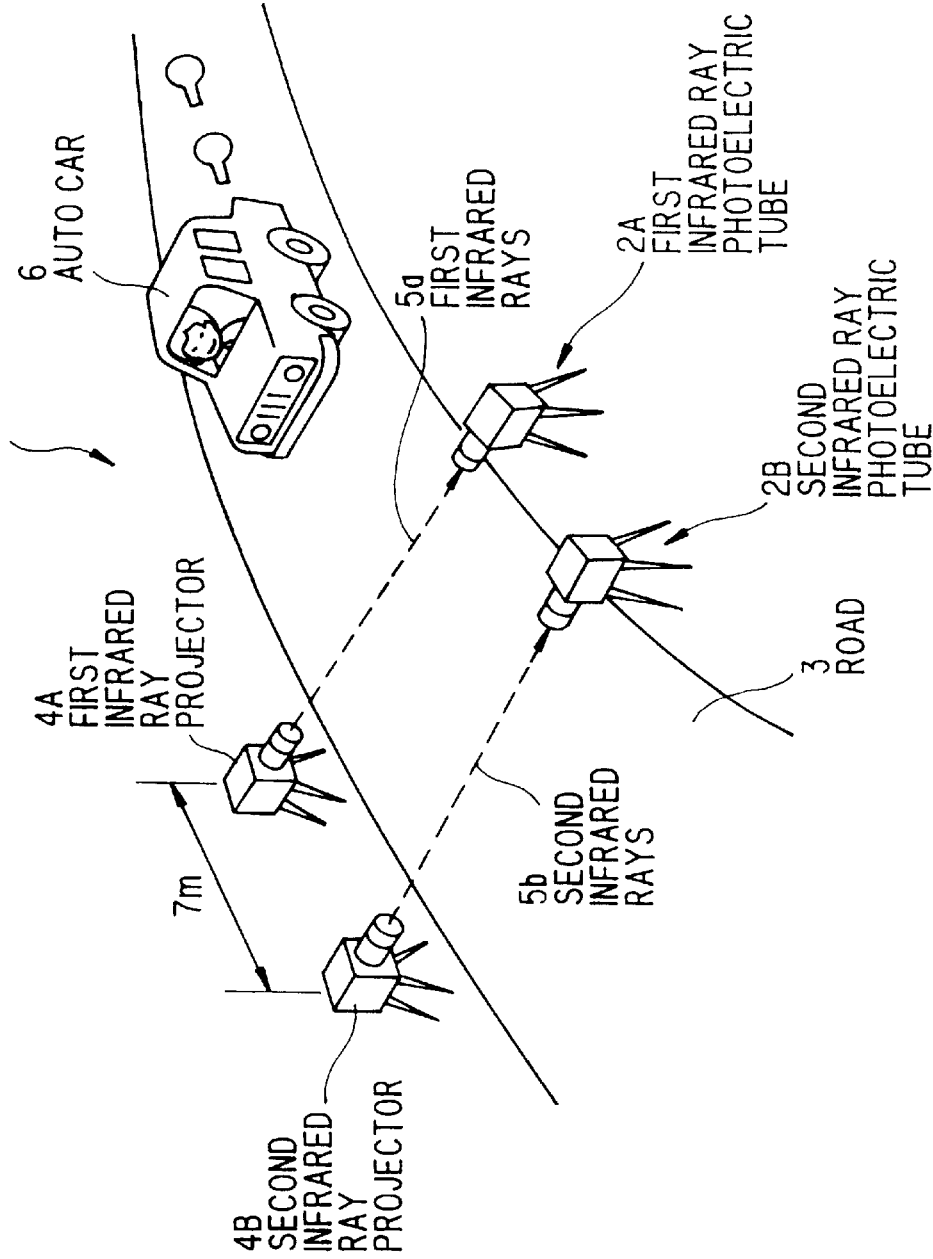
FIG. 1 is a perspective view of a conventional speed measuring apparatus for measuring a speed of a moving member.

FIG. 1 shows a conventional speed measuring apparatus for measuring a speed of a moving member. In FIG. 1, the conventional speed measuring apparatus 1 for measuring the speed of the moving member comprises a first set of a first infrared ray photoelectric tube 2A and a first infrared ray projector 4A, and a second set of a second infrared ray photoelectric tube 2B and a second infrared ray projector 4B. The first and second infrared ray photoelectric tubes 2A and 2B are placed on a side of a road 3. The first and second infrared ray projectors 4A and 4B are placed on the other side of the road 3 in opposition to the first and second infrared ray photoelectric tubes 2A and 2B, respectively. The first and second sets are positioned along the road 3 with a predetermined interval "L" of, for instance, 7 m. First and second infrared rays 5a and 5b are projected from the first and second infrared ray projectors 4A and 4B to the first and second infrared ray photoelectric tubes 2A and 2B, respectively.

When an auto car 6 moves on the road 3, the auto car 6 interrupts the first and second infrared rays 5a and 5b, respectively. The conventional speed measuring apparatus 1 measures a time period "t" from the interruption of the first iced rays 5a to that of the second infrared rays 5b to measure a speed "v" (v=L/t) of the auto car 6 by using an oscillating circuit having a CR oscillator or a quartz oscillator.

Namely, while a clock signal which has a predetermined frequency is oscillated in the oscillating circuit having the quartz oscillator or the CR oscillator, the counting of the clock signal is started when the auto car 6 interrupts the first infrared rays 5a and is ended when the auto car 6 interrupts the second infrared rays 5b. Thus, the time period "t" is calculated in accordance with the counting value of the clock signal.

The conventional speed measuring apparatus 1 for measuring a speed of a moving member by using a special purpose quartz oscillator can measure correctly the speed of the auto car 6, because the precision of the quartz oscillator is not affected in accordance with fluctuations of the temperature and the humidity.

However, the conventional speed measuring apparatus 1 for measuring a speed of a moving member by using a general purpose quartz oscillator has disadvantages in that it can not measure a speed with higher precision than an unit of $1/100$ second.

Further, the conventional speed measuring apparatus 1 for measuring a speed of a moving member by using a special purpose quartz oscillator has disadvantages in that its cost is high to measure a speed with higher precision than an unit of $1/100$ second, because a quartz oscillator which has a high oscillation frequency is expensive.

The convention speed measuring apparatus 1 for measuring a speed of a moving member by using a CR oscillator which has a low price can measure a speed with high precision, for instance, an unit of $1/62,500$ second.

However, the conventional speed measuring apparatus 1 for measuring a speed of a moving member by using the CR oscillator has disadvantages in that it can not measure correctly a speed, because the precision of the CR oscillator is affected in accordance with fluctuations of the temperature and the humidity.

Further, the conventional speed measuring apparatus 1 for measuring a speed of a moving member has disadvantages in that it can not be used as a speed measuring toy, because it is hard to miniaturize the conventional speed measuring apparatus 1 which has the first and second sets of the infrared ray projectors 4A and 4B and the infrared ray photoelectric tubes 2A and 2B to be positioned with a predetermined interval of for instance, 7 m.

Next, a speed measuring apparatus and a toy for measuring a speed of a moving member in the preferred embodiment according to the invention will be explained in FIGS. 2A to 6.

Figure 2A:
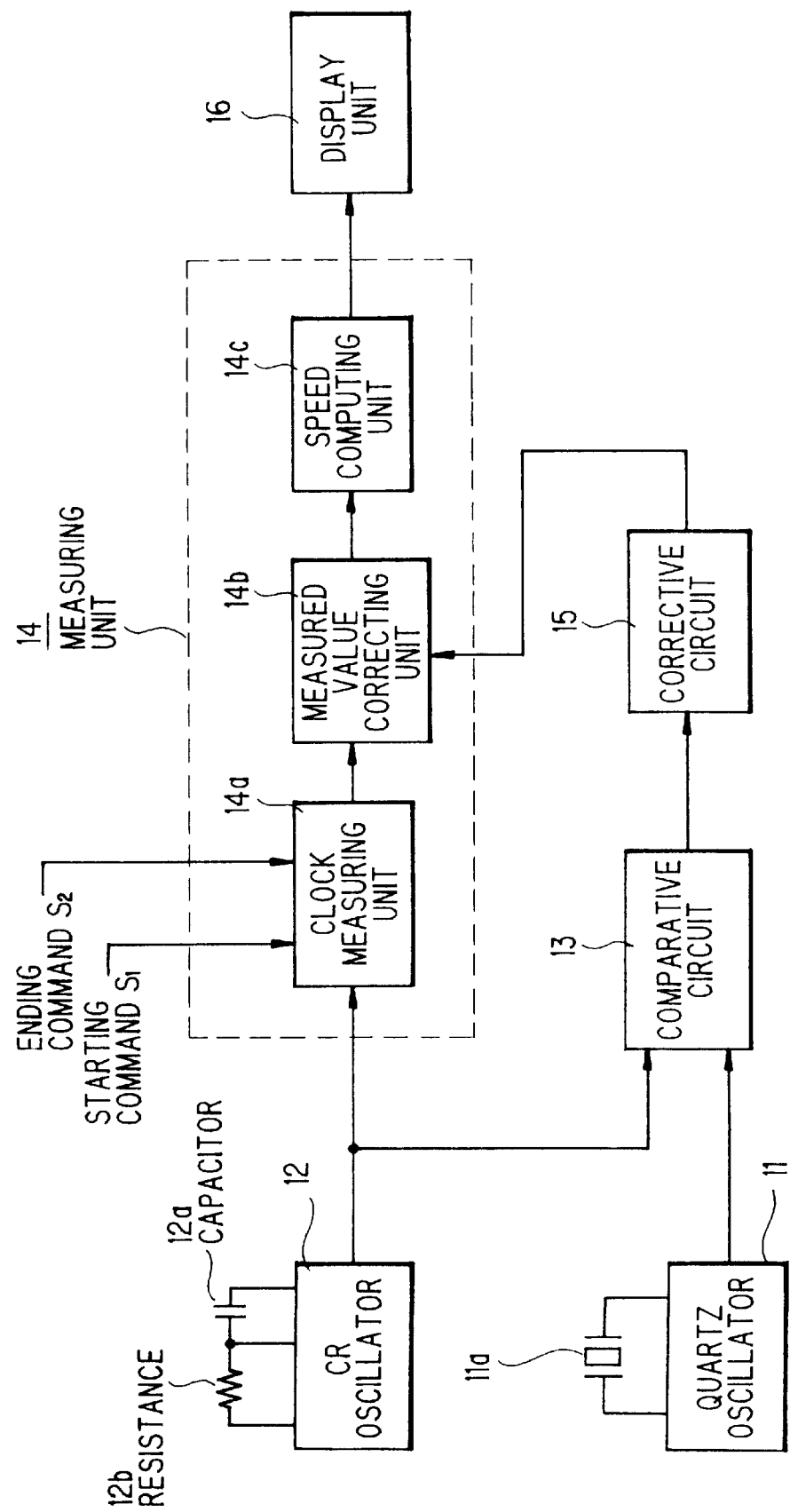
FIG. 2A is a block diagram of a speed measuring apparatus for measuring a speed of a moving member in a preferred embodiment of the present invention.

FIG. 2A shows a block diagram of a speed measuring apparatus for measuring a speed of a mowing member in the preferred embodiment of the present invention. In FIG. 2A, the speed measuring apparatus for measuring a speed of a moving member comprises a quartz oscillator 11 for oscillating a clock signal which has a predetermined frequency, a CR oscillator 12 for oscillating a clock signal which has a higher frequency than that of the quartz oscillator 11, a comparative circuit 13, connected with the quartz oscillator 11 and the CR oscillator 12, for comparing the oscillation frequency of the quartz oscillator 11 as a reference signal with the oscillation frequency of the CR oscillator 12, a corrective circuit 15, connected with the comparative circuit 13, for calculating a corrective factor in accordance with a result from the comparative circuit 13, a measuring unit 14, connected with the CR oscillator 12 and the corrective circuit 15, for measuring a speed of a moving member in accordance with the clock signal from the CR oscillator 12 and the corrective factor from the corrective circuit 15, and a display unit 16, connected with the measuring unit 14, for displaying the speed computed by the measuring unit 14.

The quartz oscillator 11 has a quartz resonator 11a and a oscillating circuit (not shown) to oscillate the clock signal which has the predetermined frequency. In general, even if the price of the quartz oscillator 11 is inexpensive, its oscillation frequency is stabilized for fluctuations of the temperature and the humidity. Thus, an inexpensive quartz oscillator 11 which has a precision of an unit of $1/100$ second can be used for the speed measuring apparatus of the present invention.

The CR oscillator 12 has a capacitor 12a and a resistance 12b to oscillate the clock signal which has the higher frequency than that of the quartz oscillator 12. Its price is also inexpensive. However, the oscillation frequency of the CR oscillator 12 is fluctuated in accordance with the fluctuations of the temperature and the humidity. For instance, the CR oscillator 12 has an unit of $1/62,500$ second to measure a speed.

The comparative circuit 13 checks the fluctuation of the oscillation frequency of the CR oscillator 12 based on the oscillation frequency of the quartz oscillator 11 which oscillates with the reference signal.

The measuring unit 14 comprises a clock measuring unit 14a for measuring the clock signal of the CR oscillator 12 between a starting command $S_1$ and an ending command $S_2$ supplied thereto, a measured value correcting unit 14b, connected with the clock measuring unit 14a and the corrective circuit 15, for correcting the measured value from the clock measuring unit 14a in accordance with the corrective factor from the corrective circuit 15 to remove an effect of the fluctuations of the temperature and the humidity, and a speed computing unit 14c for computing the time period "t" between the command $S_1$ and the command $S_2$ in accordance with a value from the measured value correcting unit 14b and computing the speed "v" of the moving member in accordance with the time period "t". The display unit 16, for instance, a LCD, etc. displays the speed of the moving member digitally.

In the speed measuring apparatus, when the stag command $S_1$ is supplied from the sensor (not shown) to the clock measuring unit 14a in the measuring unit 14, the clock measuring unit 14a starts to count the clock signal from the CR oscillator 12. The quartz oscillator 11 and the CR oscillator 12 oscillate continuously with thee respective oscillating frequencies. The comparative circuit 13 compares the frequency of the quartz oscillator 11 with the frequency of the CR oscillator 12. For instance, the comparative circuit 13 counts a number of the clock signals from the CR oscillator 12 in a cycle of the quartz oscillator 11. If a reference ratio of the oscillation frequency of the quartz oscillator 11 and that of the CR oscillator 12 is known beforehand, an error of the oscillation frequency of the CR oscillator 12 responsive to the fluctuations of the temperature and the humidity can be calculated by the reference ratio and a ratio of the fluctuations of a measuring condition.

In the reference environmental condition, the CR oscillator 12 oscillates with the generation of clock signals of 62,500 during the cycle of $\frac{1}{100}$ second of the quartz oscillator 11. If it is assumed that the reference environmental condition has the temperature of 20° C. and the humidity of 60%, the fluctuation of the measured value of the clock signals from the CR oscillator 12 is increased, as the fluctuations of the temperature and the humidity from the reference environment condition is increased.

FIG. 2B shows the corrective factor which is calculated by the reference ratio and the ratio of the fluctuations of the measuring condition. In FIG. 2B, only five conditions are shown for explanation. If the temperature is higher than that of the reference environmental condition, the counting number of the oscillation frequency of the CR oscillator 12 is more than 62,500 of the reference environmental condition. If the temperature is lower than that of the reference environmental condition, the counting number of the oscillation frequency of the CR oscillator 12 is less than 62,500 of the reference environmental condition. Thus, when the corrective factor is calculated by the corrective circuit 15 in accordance with the ratio which is calculated by the comparative circuit 13, and the measured value is corrected by the corrective factor, the measured value is regarded as the value which is calculated by the clock signals from the CR oscillator 12 operated under the reference environmental condition. On the other hand, the same result is obtained by correcting the time period calculated by the oscillation frequency of the CR oscillator 12 instead of correcting the oscillation frequency of the CR oscillator 12.

Namely, when a measured value of clock signals from the CR oscillator 12 in a cycle of the quartz oscillator 11 is "n", the corrective factor "δ" is calculated by a formula (1) as follows.

$$\delta = n/62,500 \qquad (1)$$

If "n" is 62,510 to be the condition $a_1$ in FIG. 2B, δ is as follows.

$$\delta = 62,510/62,500 = 1.00016 \qquad (2)$$

When the clock measured value is obtained to be $N_m$=7,005,000 between the starting command $S_1$ and the ending command $S_2$, the clock measured value "$N_r$" under the reference environmental condition is as follows.

$$N_r = 7,005,000/1.00016 = 7,003,879 \qquad (3)$$

The time period "t" between the commands $S_1$ and $S_2$ is calculated by the result of the formula (3), as follows.

$$t = (7,003,879/62,500) \times \frac{1}{100} = 1.1206 \text{ (second)} \qquad (4)$$

Where a moving distance of the moving member is 3 m, the speed "v" of the moving member is as follows.

$$v = 3/t = 2.677 \text{ (m/s)} \qquad (5)$$

Therefore, in the above speed measuring apparatus for measuring a speed of a moving member, the speed can be measured correctly with an increased number of significant figures, and the increase of the cost is suppressed, even if the oscillation frequency of the CR oscillator 12 is fluctuated by the fluctuations of the temperature and the humidity, because the clock measured value can be calculated as the same value to be calculated under the reference environmental condition by correcting the clock measured value of clock signals from the CR oscillator 12 based on the clock signal of the quartz oscillator 11.

For instance, two photosensors each of which is a combination with a light emitting element and a light receiving element are positioned with a predetermined interval to provide the starting command $S_1$ and the ending command $S_2$. When the moving member passes through the two photosensors, signals corresponding to the commands $S_1$ and $S_2$ are generated in the two photosensors. The measurement in the clock measuring unit 14a is started and ended in accordance with the generated signals.

Figure 3:
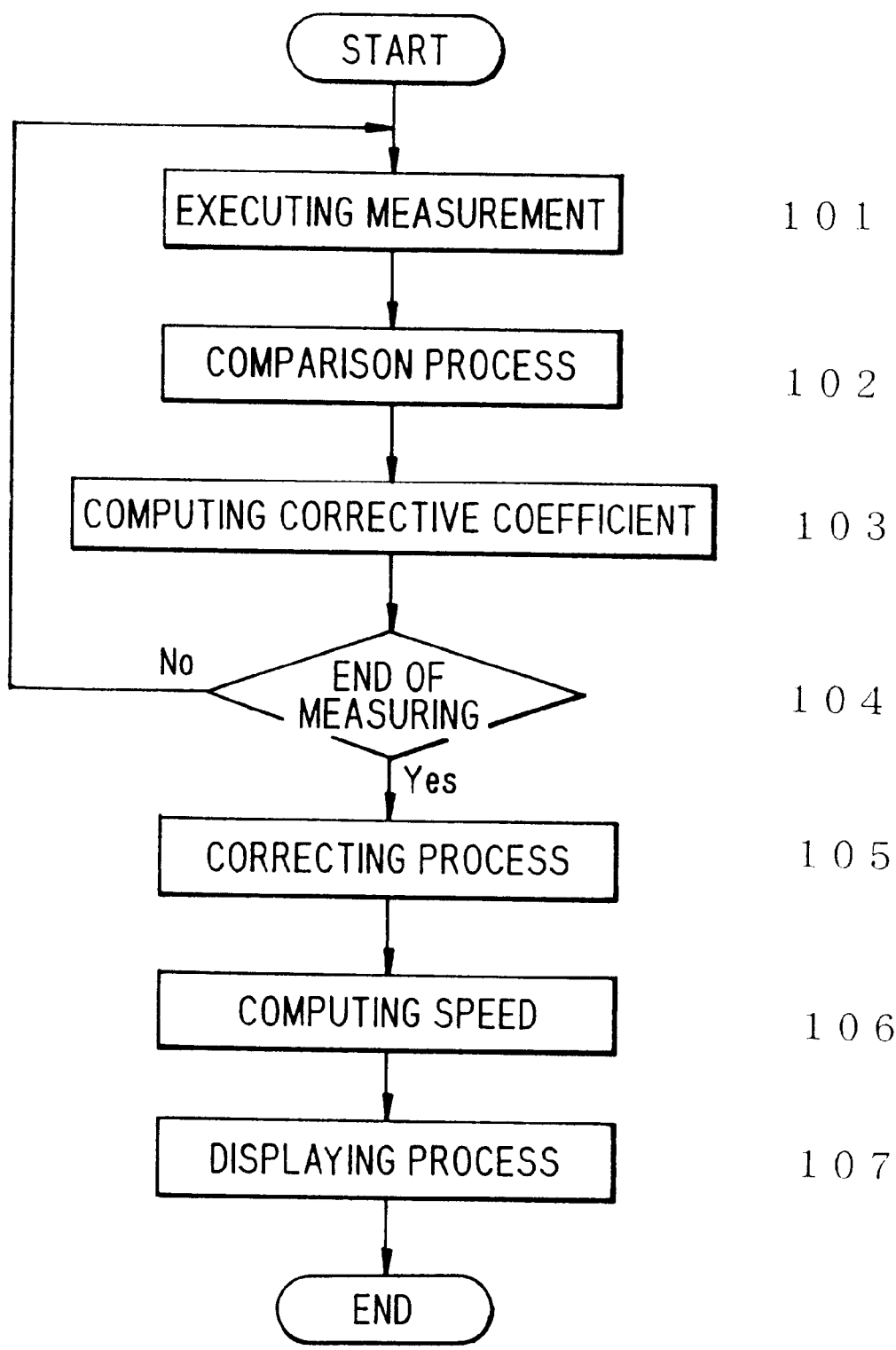
FIG. 3 is a flow chart of a process of measuring a speed of a moving member.

FIG. 3 shows a flow chart of a measuring process of the speed measuring apparatus for measuring a speed of a moving member. When the starting command $S_1$ is supplied to the clock measuring unit 14a of the measuring unit 14 in accordance with the interruption of the moving member, the clock measuring unit 14a starts to count the clock signal from the CR oscillator 12 at the step 101. While the clock measuring unit 14a counts the clock signal from the CR oscillator 12, the comparative circuit 13 calculates a fluctuation of the oscillation frequency of the CR oscillator 12 based on the oscillation frequency of the quartz oscillator 11 at the step 102. The corrective factor "δ" is calculated in accordance with a result from the comparative circuit by the corrective circuit 15 at the step 103.

It is determined whether the ending command $S_2$ is generated or not, namely, whether measuring the clock signal from the CR oscillator 12 is ended or not at the step 104. If measuring the clock signal is ended, a measured value is corrected by the measured value correcting unit 14b at the step 105. The speed "v" of the moving member is computed by the speed computing unit 14c which calculates a time period in accordance with the measured value to be corrected at the step 106. Finally, the speed "v" is displayed on the display unit 16 by digital at the step 107.

Next, a speed measuring toy for measuring a speed of a moving member in the preferred embodiment according to the invention will be explained in FIGS. 4 to 6.

Figure 5A:
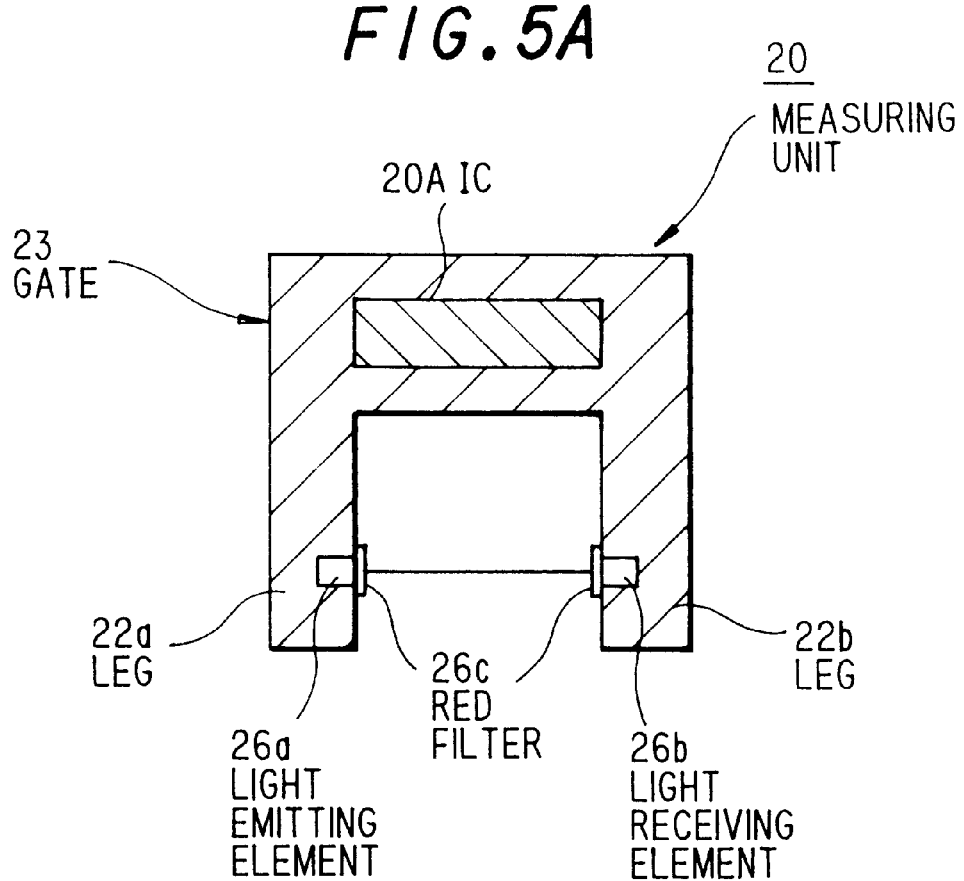
FIG. 5A is a cross-sectional view of the speed measuring toy for measuring a speed of a moving member illustrated in FIG. 4.
Figure 5B:
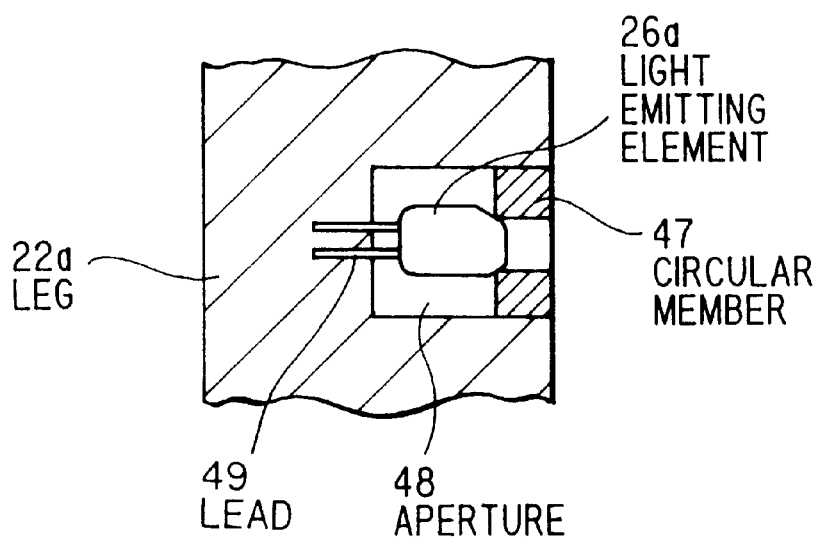
FIG. 5B is a partly enlarged cross-sectional view of a light emitting element of the speed measuring toy for measuring a speed of a moving member illustrated in FIG. 5A.

In FIGS. 4, 5A and 5B, the speed measuring toy 20 for measuring a speed of a moving member 27 comprises a gate 23, a LCD (Liquid Crystal Display) 24, placed on the upper surface of the gate 23, for displaying the speed, a mode switching button 25 for switching displaying and measuring modes, and first and second photosensors 26A and 26B, contained in the gate 23, for detecting passing of the moving member.

The gate 23 comprises a couple of legs 22a and 22b, a coupler portion 21 for coupling upper portions of the legs 22a and 22b, and a passing opening 28 through which the moving member 27 such as a toy of car passes.

The first and second photosensors 26A and 26B are positioned with a predetermined interval of, for instance, "L" m in a direction of movement of the moving member 27. The first and second photosensors 26A and 26B produce output signals which are a starting command $S_1$ and an ending command $S_2$ when tie first and second photosensors 26A and 26B detect the moving member 27, respectively.

The mode switching button 25 is used to select one of several modes such as a "representing mode", a "time correcting mode", a "speed check mode", and a "lap time mode". In the "time representing mode", the LCD 24 displays a current time by "hour" and "minute". In the "speed check mode", the LCD 24 displays the speed of the moving member 27 passing through the passing opening 28 by processing as shown in FIG. 3. In the "lap time mode", the LCD 24 displays a lap time of the moving member 27 moving on a circuit course from any passing through the passing opening 28 to next passing through the passing opening 28. In the "time correcting mode", the current time to be displayed on the LCD can be corrected.

In FIG. 5A, an IC (Integrated Circuit) 20A for computing a speed is placed in the coupler portion 21 of the gate 23. The first photosensors 26A comprises a light emitting element 26a for emitting a light, a light receiving element 26b for receiving the emitted light from the light emitting element 26a, and red filters, which cover front surfaces of the light emitting element 26a and the light receiving element 26b, for passing a particular wavelength of the light to prevent a miss operation against an outer light. When the moving member 27 interrupts the light from the light emitting element 26a to the light receiving element 26b, the interruption signal is output to the IC 20A from the light receiving element 26b.

In FIG. 5B, the light emitting element 26a which is placed in the aperture 48 formed in the leg 22a is connected with the IC 20a via a pair of lead wires 49. The light emitting element 26a is also supported by the pair of the lead wires 49, and its tip is fixed by a circular part 47. The emitting light is prevented from the diffusion to a skew direction, because the circular past 47 has a hole in its center to pass the emitting light. The light receiving element 26b receives the light from only the light emitting element 26a, because the constitution of the light receiving element 26b is the same as that of the light emitting element 26a. The error detection of a light is prevented by interrupting the light from the skew direction.

Figure 6:
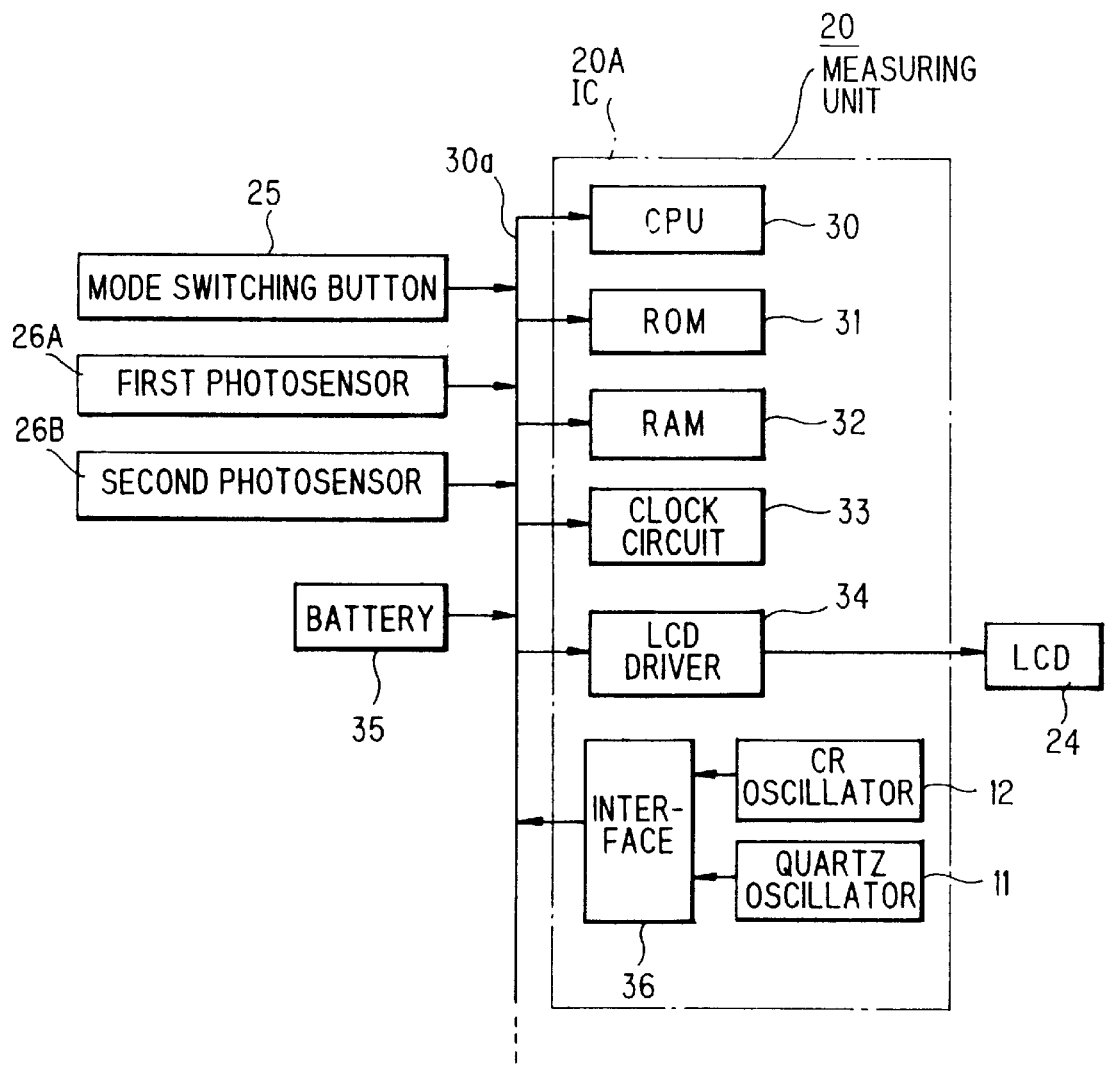
FIG. 6 is a block diagram of a computing unit of the speed measuring toy for measuring a speed of a moving member illustrated in FIG. 4.

In FIG. 6, the speed measuring toy 20 comprises an IC 20A, a LCD 24, a mode switching button 25, a first photosensor 26A, a second photosensor 26B, a bus 30a, and an electric battery 35 such as a manganese cell, a nickel-cadmium cell, etc. for supplying a power to each part. The IC 20A comprises a CPU (Central Processing Unit) 30 for operating a program as shown in FIG. 3, a ROM (Read Only Memory) 31 for storing the program, a RAM (Random Access Memory) 32 for storing data which includes the interval of "L" between the first and second photosensors 26A and 26B, measuring results, correcting results, etc., a clock circuit 33 having a first function which provides a current time having "hour" and "minute", a second function which times an elapsed time since inputting a set signal, and a third function which corrects a current time, a LCD driver 34, connected with the LCD 24, for controlling the LCD 24, a quart oscillator 11, a CR oscillator 12a, and an interface 36 for connecting the bus 30a with the quartz oscillator 11 and the CR oscillator 12.

The CPU 30, the ROM 31, the RAM 32, the clock circuit 33, the LCD driver 34, the quartz oscillator 11, the CR oscillator 12a, and the interface 36 may be integrated on a chip as the IC 20A which is provided in the coupler portion 21.

The bus 30a connects the mode switching button 25, the first photosensor 26A, the second photosensor 26B, and each of parts contained in the IC 20A with each other. The battery 35 is replaced by an external power source such as an AC adapter.

The CPU 30 executes a mode selected by an operation of the mode switching button 25. In the "time representing mode", a current time which is provided by the clock circuit 33 is displayed on the LCD 24. In the "speed check mode", a time period "Tm" from interrupting the emitting right of the first photosensor 26A to interrupting the emitting light of the second photosensor 26B is measured by using the clock circuit 33, and the speed of the moving member 27 to be displayed on the LCD 24 is calculated from the time of "Tm" and the interval of "L" between the first and second photosensors. In the "lap time mode", a time from any interruption of the first (or second) photosensor 26A (or 26B) to the next interruption of the first (or second) photosensor 26A (or 26B) which is measured by the clock circuit 33 is displayed on the LCD 24. In the "time correcting mode", a numeral of the hour is gained one by one by a manual operation of the interruption of the first photosensor 26A, while a numeral of the second is gained one by one by the manual operation of the interruption of the second photosensor 26B.

Therefore, in the speed measuring toy 20, the speed can be measured correctly by correcting the fluctuations of the temperature and the humidity, because a time data which is provided by the clock circuit 33 is calculated by the clock signal from the CR oscillator 12 which is corrected in accordance with the clock signal from the quartz oscillator 11.

Further, in the speed measuring apparatus and the toy, the temperature and/or the humidity can be measured by the oscillation frequency of the CR oscillator 12, and displayed on the display unit 16 such as the LCD 24.

Therefore, in the speed measuring apparatus and the toy for measuring a speed of a moving member, the speed can be measured correctly with an increased number of significant figures, and the increase of the cost is suppressed, even if the oscillation frequency of the CR oscillator is fluctuated by the fluctuations of the temperature and the humidity, because the clock signal from the CR oscillator is corrected in accordance with the clock signal from the quartz oscillator.

Further, the size of the speed measuring apparatus can be made small to be used for a toy, because the speed can be measured correctly, even if the interval between the tow photosensors is made short.

As this invention may be embodied in several forms without departing from the spirit of essential characteristics thereof, the present embodiment is therefore illustrative and not restrictive, since the scope of the invention is defined by the appended claims rather than by the description preceed-

I claim:

1. A speed measuring apparatus for measuring a speed of a moving object, comprising:

first oscillating means for generating a first clock signal of a first frequency substantially dependent on fluctuations of temperature and humidity;

means for measuring data by using said first oscillating means;

second oscillating means for generating a second clock signal of a second frequency substantially independent of fluctuations of temperature and humidity; and means for calculating a corrective factor by a ratio of said first frequency of said first oscillating means and said second frequency of said second oscillating means, and for correcting said data by using said corrective factor.

2. The speed measuring apparatus for measuring a speed, as defined in claim 1, wherein:

said first oscillating means includes a capacitor and a resistance; and said second oscillating means includes a quartz resonator.

3. The speed measuring apparatus for measuring a speed as defined in claim 1, wherein:

said data is at least one of a speed and a lap time of said moving object, the time, and ambient temperature and humidity.

4. A speed measuring toy for measuring a speed of a moving member, comprising:

a gate comprising a pair of legs and a coupler portion which couples said legs, said gate having a passing opening through which said moving member passes;

means, placed in said gate, for detecting said moving member to produce a detecting signal;

first oscillating means for generating a first clock signal of a first frequency substantially affected by fluctuations of temperature and humidity;

means for measuring speed data by using said first oscillating means in accordance with said detecting signal;

second oscillating means for generating a second clock signal of a second frequency substantially independent of said fluctuations of said temperature and said humidity;

means for calculating a corrective factor by a ratio of said first frequency of said first oscillating means and said second frequency of said second oscillating means, and for correcting said speed data by using said corrective factor; and means for displaying said speed data from said measuring means after said speed data is corrected by said correcting means.

* * * * *